US006904272B2

(12) United States Patent
Hitomi et al.

(10) Patent No.: US 6,904,272 B2
(45) Date of Patent: Jun. 7, 2005

(54) DIGITAL BROADCAST RECEIVER

(75) Inventors: Akihiko Hitomi, Osaka (JP); Akio Inoue, Nara (JP); Yoshikazu Otsubo, Hirakata (JP); Takayuki Hamabata, Nara (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 737 days.

(21) Appl. No.: 09/998,779

(22) Filed: Dec. 3, 2001

(65) Prior Publication Data

US 2002/0068539 A1 Jun. 6, 2002

(30) Foreign Application Priority Data

Dec. 5, 2000 (JP) ....................................... 2000-369958

(51) Int. Cl.[7] .................................................. H04B 1/18

(52) U.S. Cl. ............................... 455/186.1; 455/161.1; 455/161.3; 455/166.1

(58) Field of Search ............................... 455/45, 185.1, 455/186.1, 187.1, 188.1

(56) References Cited

U.S. PATENT DOCUMENTS

| | | | | | |
|---|---|---|---|---|---|
| 6,058,118 A | * | 5/2000 | Rault et al. | ................. | 370/464 |
| 2001/0043584 A1 | * | 11/2001 | Kersken et al. | ............. | 370/349 |
| 2002/0055331 A1 | * | 5/2002 | King-Smith | ............... | 455/3.05 |

FOREIGN PATENT DOCUMENTS

| | | |
|---|---|---|
| JP | 01-256230 | 10/1989 |
| JP | 02-253723 | 10/1990 |
| JP | 10-022952 | 1/1998 |
| JP | 10-209983 | 8/1998 |
| JP | 10-276104 | 10/1998 |
| JP | 10-327113 | 12/1998 |
| JP | 10-336125 | 12/1998 |
| JP | 11-177511 | 7/1999 |
| JP | 2000-013265 | 1/2000 |
| JP | 2000-201117 | 7/2000 |

OTHER PUBLICATIONS

Copy of Japanese Patent Office Action for corresponding Japanese Patent Application No. 2000–369958 dated Jan. 16, 20004.

* cited by examiner

*Primary Examiner*—Curtis Kuntz
*Assistant Examiner*—Tuan Pham
(74) *Attorney, Agent, or Firm*—Armstrong, Kratz, Quintos, Hanson & Brooks, LLP

(57) ABSTRACT

The invention provides a digital broadcast receiver for receiving broadcast waves comprising multiplexed broadcast signals of a plurality of channels including a main channel and a subchannel. The receiver comprises demodulator circuits for demodulating received data of one of the channels selected and outputting the resulting data, a memory capable of storing received data as to a program transmitted on the subchannel, and a controller for writing the received data as to the program transmitted on the subchannel to the memory while updating the received data at all times, and reading the received data stored in the memory from the head of the program and feeding the read data to the demodulator circuits upon a changeover from the main channel to the subchannel. When the main channel is changed over to the subchannel, the program broadcast on the subchannel can be listened to always from the beginning.

4 Claims, 5 Drawing Sheets

DIGITAL BROADCAST RECEIVER

FIELD OF THE INVENTION

The present invention relates to digital broadcast receivers for broadcast waves comprising the broadcast signals of a plurality of channels as multiplexed, the receivers being adapted to select one channel selected by the user, based on header data contained in the broadcast signal of each channel.

BACKGROUND OF THE INVENTION

As digital audio broadcasts for mobile bodies, DAB (Digital Audio Broadcast) systems have been introduced into actual use in recent years wherein digital audio signals are encoded with a high efficiency and modulated by OFDM (Orthogonal Frequency Division Multiplexing). Studies are also underway on IBOC (In-Band On-Channel) digital broadcasts which utilize the same frequency band as the existing analog audio broadcasts.

With such digital audio broadcasts, the broadcast signals of a plurality of channels can be transmitted as multiplexed in a signal band. For example, it is possible to provide a main channel for broadcasting a main program and a subchannel for repeatedly broadcasting an independent program of relatively short period of time, such as a weather forecast or traffic information, and transmit the broadcast signals of these channels at the same time. The broadcast signals of the channels contain header data, which enables the receiver to select one of the channels.

With digital broadcast receivers, it is likely that when the reception channel is changed over from the main channel to the subchannel, the program on the subchannel has already been started. Starting to listen to the program from an intermediate part thereof, the user will then encounter difficulty in understanding the contents of the program. In this case, the listener has to wait until the program is broadcast again from the beginning, hence the problem of inconvenience.

SUMMARY OF THE INVENTION

Accordingly, an object of the present invention is to provide a digital broadcast receiver which is so adapted that when the reception channel is changed over from the main channel to a subchannel, the program on the subchannel can be listened to always from the beginning.

The present invention provides a digital broadcast receiver for receiving broadcast waves comprising multiplexed broadcast signals of a main channel and a subchannel, the receiver being adapted to select one of the channels selected by the user based on header data contained in the broadcast signal of each channel and comprising:

- demodulator means for demodulating received data of the selected channel and outputting the resulting data,
- a memory having a capacity to store received data as to a program transmitted on the subchannel in an amount of one program,
- memory writing control means for writing the received data as to the program transmitted on the subchannel to the memory while updating the received data at all times, and
- memory reading control means for reading the received data stored in the memory from the head of the program and feeding the read data to the demodulator means in response to a manipulation for changing over the main channel to the subchannel.

With the digital broadcast receiver of the present invention, the received data as to the program transmitted on the subchannel is written to the memory while being updated at all times. For example, in the case where the same program is broadcast repeatedly, all the received data constituting the program is always stored in the memory, with one of the addresses thereof serving as the head address. Further even when the program on the subchannel is changed, all the received data constituting the program broadcast after the change will be stored, with one of the addresses serving as the head address.

Accordingly, upon a changeover from the main channel to the subchannel, the received data stored in the memory is read from the head address and fed to the demodulator means, whereby the program can be reproduced from the beginning to the end.

Stated more specifically, the received data as to one program transmitted on the subchannel comprises a plurality of frames each comprising a header portion and subchannel data portion, the header portion of each frame having written thereto operation control data including the total number of frames and the order of the frame, and the memory reading control means recognizes the frames at the head and tail end of the program stored in the memory based on the operation control data. This assures facilitated control in reading the received data as to one program from the memory.

Further stated more specifically, the digital broadcast receiver of the invention comprises data changeover means for switching between the received data of the main channel and the received data of the subchannel and feeding the received data thus selected to the demodulator means. After completely feeding the received data as to one program transmitted on the subchannel to the demodulator means, the data changeover means is automatically changed over to the operation of feeding received data as to one program transmitted on the main channel to the demodulator means. After the program of the subchannel has been completely reproduced, the reception channel is automatically changed over to the main channel, enabling the user to continuously listen to the program on the main channel.

As described above, the digital broadcast receiver of the present invention is so adapted that when the reception channel is changed over from the main to the subchannel, the program on the subchannel can be listened to always from the beginning.

DETAILED DESCRIPTION OF EMBODIMENT

Figure 1:
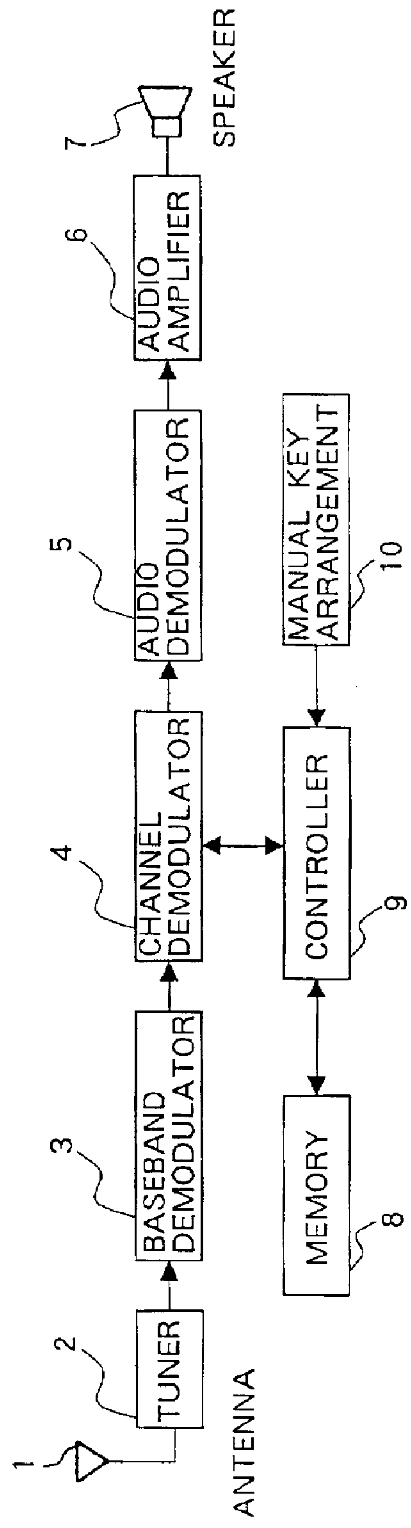
FIG. 1 is a block diagram showing the construction of a DAB receiver of the invention.

With reference to the drawings, an embodiment of DAB receiver of the present invention will be described below in detail. As shown in FIG. 1, the DAB receiver embodying the invention comprises a tuner 2 having an antenna 1 for receiving radio waves comprising multiplexed digital audio signals of a multiplicity of channels and adapted to select an RF signal, a baseband demodulator circuit 3 for subjecting the RF signal selected by the tuner 2 to baseband demodulation to produce digital composite data, a channel demodulator circuit 4 for subjecting the digital composite data obtained from the baseband demodulator circuit 3 to channel demodulation to obtain main channel and subchannel received data, an audio demodulator circuit 5 for subjecting to audio demodulation the received data of the channel selected by the user from between the main channel and subchannel demodulated by the circuit 4 to produce audio data, and an audio amplifier circuit 6 for amplifying the audio data obtained from the circuit 5 and feeding the resulting data to a speaker 7.

Connected to the channel demodulator circuit 4 is a controller 9 comprising a microcomputer and having connected thereto a memory 8 and manual key arrangement 10. The controller 9 always writes to the memory 8 the subchannel received data obtained from the channel demodulator circuit 4 while updating the data, whereby received data constituting one program on the subchannel is cyclically written to the memory 8 at all times, with some address serving as the head address.

Figure 2:
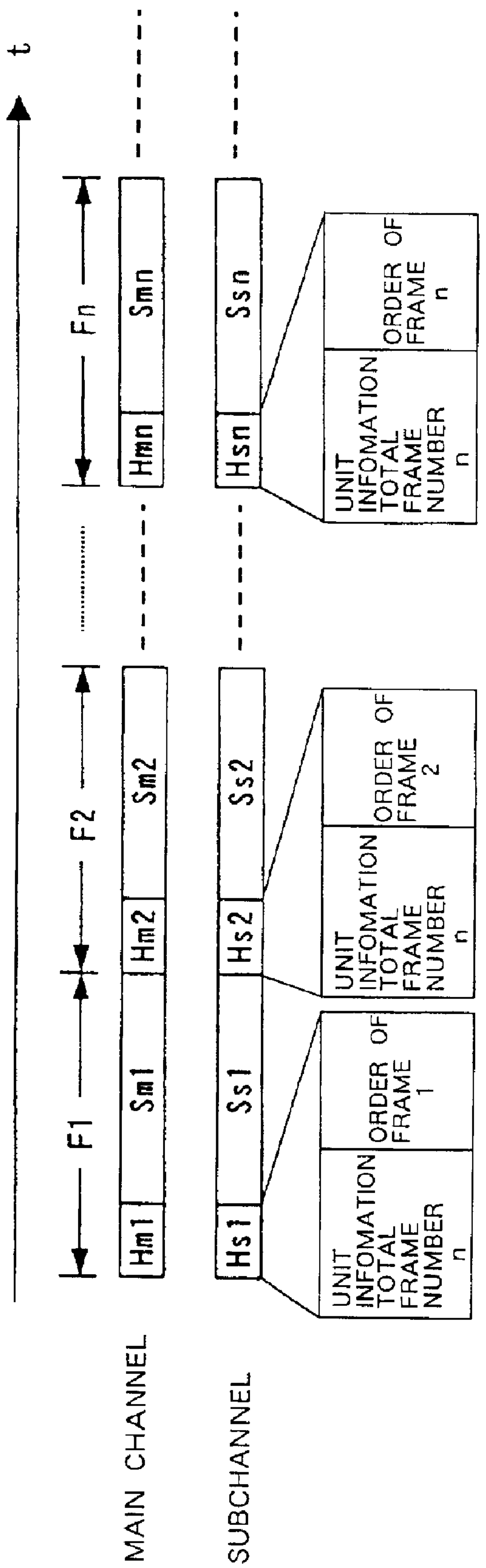
FIG. 2 is a time chart showing data transmission formats for the main channel and a subchannel.

FIG. 2 shows data transmission formats for the main channel and the subchannel. The data to be transmitted on the main channel is time-series data in frame units comprising header data Hmi (i=1, 2, . . . n, . . . ) and main channel data Smi (i=1, 2, . . . n, . . . ). Similarly, the data to be transmitted on the subchannel is time-series data in frame units comprising header data Hsi (i=1, 2, . . . n, . . . ) and subchannel data Ssi (i=1, 2, . . . n, . . . ).

A predetermined number of frames (F1 to Fn) of subchannel data provide one program (unit information). The header data of each frame includes the total number n of frames, and the order 1 to n of the frame. In this case, the memory 8 needs to have a capacity to store the subchannel data Ss1 to Ssn contained in at least n frames.

Figure 3:
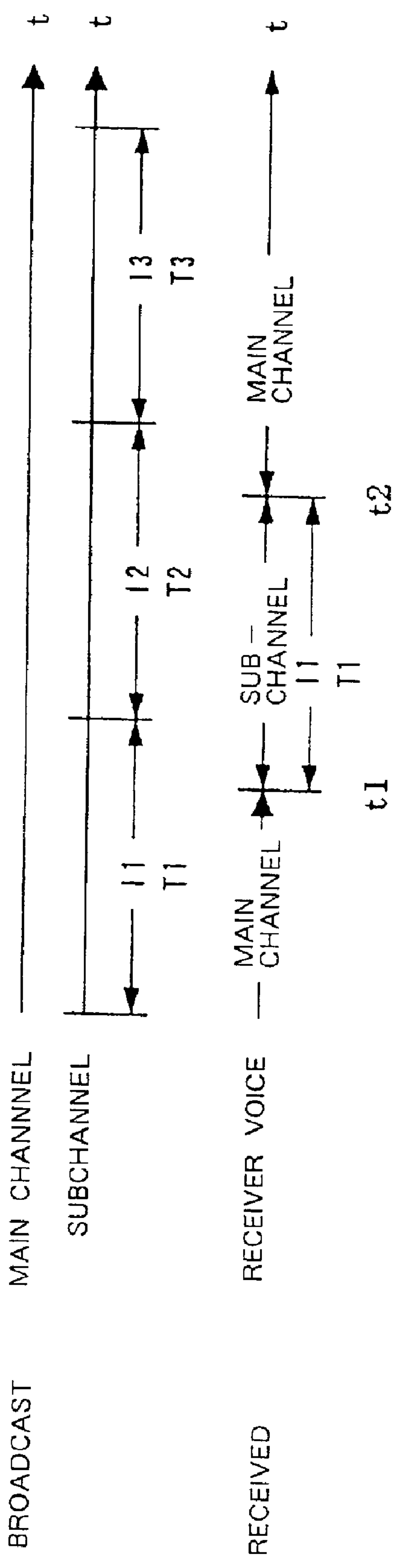
FIG. 3 is a time chart showing an example of operation subsequent to a changeover from the main channel to the subchannel.

For example in the case where items of unit information (programs) I1, I2, I3 are transmitted on the subchannel in succession as shown in FIG. 3, suppose the user changes over the main channel to the subchannel at time t1. The conventional receiver starts to reproduce voice from an intermediate portion of the unit information I1, whereas the receiver of the invention is capable of starting to reproduce voice from the beginning of the unit information I1 through the procedure to be described below.

Figure 4:
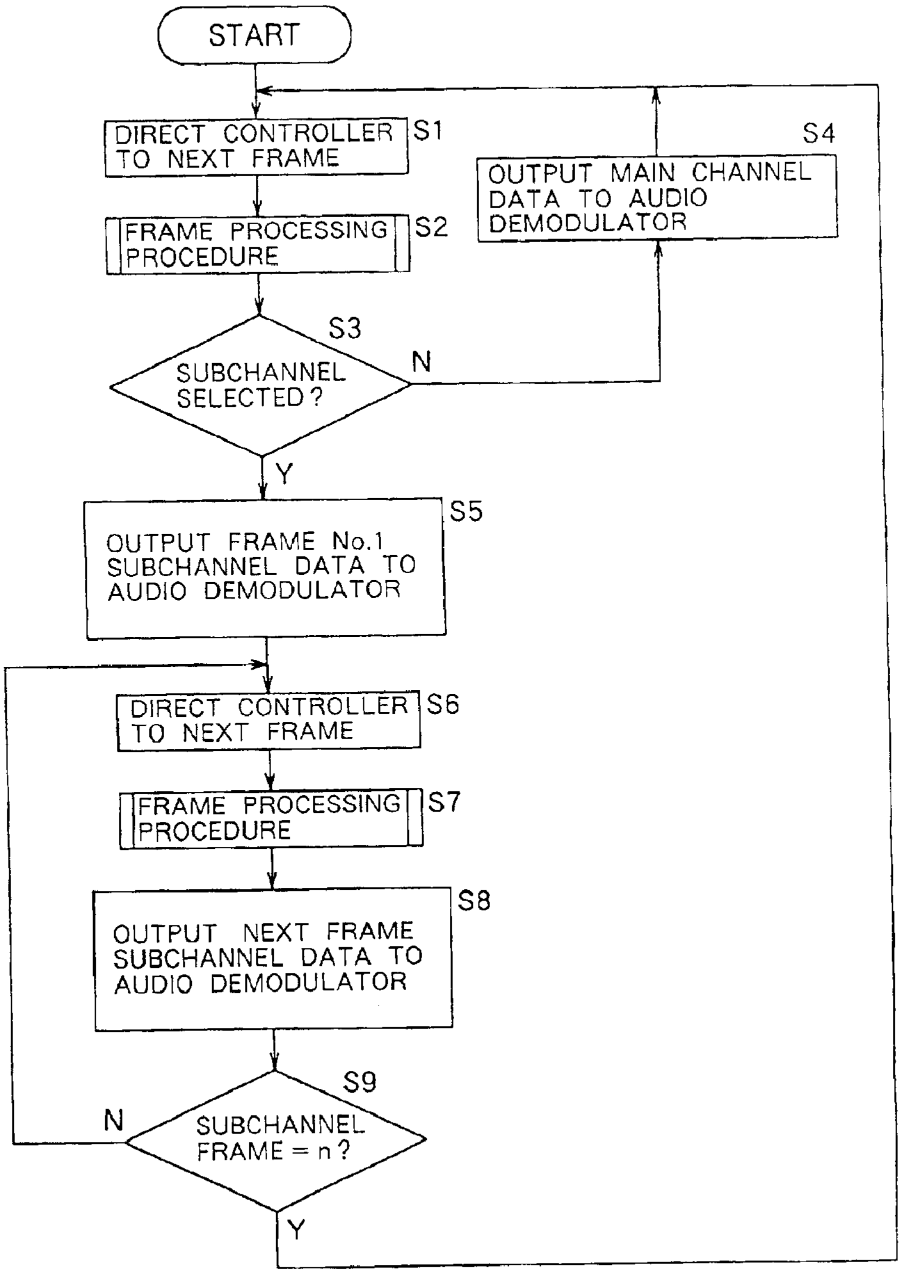
FIG. 4 is a flow chart showing the control procedure of the DAB receiver of the invention.
Figure 5:
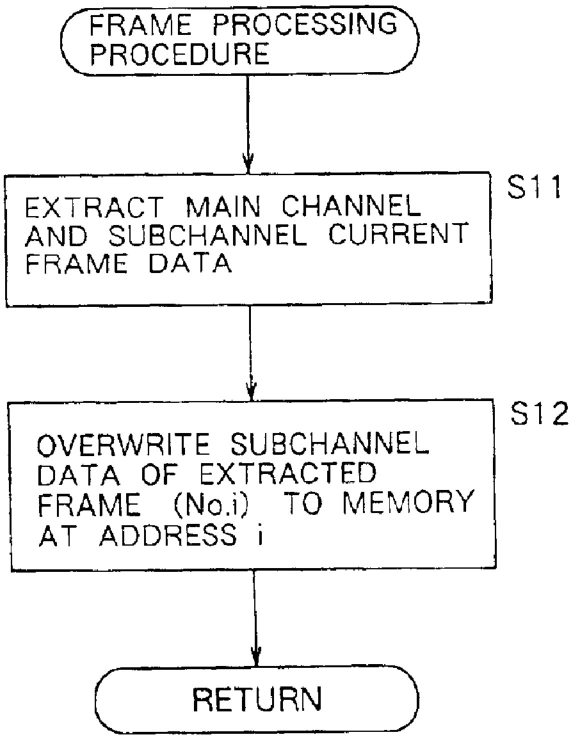
FIG. 5 is a flow chart showing a frame processing procedure.

FIG. 4 shows the reception control procedure to be executed by the controller 9. With the receiver receiving the broadcast of the desired station with the power source of the receiver turned on, the controller is directed in step S1 to the process of the next frame of the channel data received, and the frame processing procedure shown in FIG. 5 is executed in step S2. Stated more specifically, the data as to the current frames of the main channel and the subchannel is extracted in step S11, and the subchannel data of the extracted frame (No. i) is thereafter overwritten to an address i of the memory in step S12.

Subsequently, an inquiry is made in FIG. 4, step S3 as to whether the subchannel is selected by manipulating the key arrangment 10. If the answer is negative, step S4 follows to feed the main channel data to the audio demodulator circuit 5. When the answer to the inquiry of step S3 is affirmative, step S5 follows to deliver the data of the head frame (No. 1) of the program on the subchannel to the audio demodulator circuit 5. In the next step S6, the controller is directed to the processing of the next frame, and the frame processing procedure of FIG. 5 is performed in step S7. The subchannel data of the next frame is thereafter output to the audio demodulator circuit 5 in step S8 of FIG. 4. Next, an inquiry is made in step S9 as to whether the frame number of the subchannel is in match with the total number n of frames obtained from the header. When the answer is negative, steps S6 to S8 are repeated.

Consequently, the subchannel data (frames No. 1 to No. n) is read from the memory for reproduction while the subchannel data is being written to the memory by the frame processing procedure. When the inquiry of step S9 is answered in the affirmative, the sequence returns to step S1.

For example, in the case where data providing the same program is transmitted on the subchannel as unit information of time series I1, I2, I3 in succession as shown in FIG. 3, the data included in unit information is written to the memory 8 of the DAB receiver while being updated. Accordingly, the memory 8 has always stored therein data as to one program in the past in which the currently received data is the latest data.

In the case where the user changes over the main channel to the subchannel at time t1, the controller 9 starts to read the unit information I1 of the subchannel stored in the memory 8 first from the head frame at this time t1, and the read data is delivered to the audio demodulator circuit for the reproduction of the program I1. Thus, the user can listen to the program from the beginning.

Upon completion of reproduction of the program I1 at time t2, subchannel is changed over to the main channel. This enables the user to listen to the program of the main channel without manipulating the receiver in any way.

The items of time-series unit information I1, I2, I3 in the example shown in FIG. 3 are repetitions of the same program, but may be different programs. In this case, after the program I1 has been reproduced upon a changeover, the next programs I2 and I3 are reproduced. The subchannel is then changed over to the main channel by the user's manipulation.

What is claimed is:

1. A digital broadcast receiver for receiving broadcast waves comprising multiplexed broadcast signals of a plurality of channels including a main channel for broadcasting a main program and a subchannel for broadcasting an independent program of relatively short period of time, the receiver being adapted to select one of the channels selected by the user based on header data contained in the broadcast signal of each channel, the digital broadcast receiver being characterized in that the receiver comprises:

demodulator means for demodulating received data of the selected channel and outputting the resulting data, a memory having a capacity to store received data as to the program transmitted on the subchannel in an amount of one program, memory writing control means for writing the received data as to the program transmitted on the subchannel to the memory while updating the received data at all times, and memory reading control means for reading the received data stored in the memory from the head of the program and feeding the read data to the demodulator means in response to a manipulation for changing over the main channel to the subchannel.

2. A digital broadcast receiver according to claim 1 wherein the received data as to one program transmitted on the subchannel comprises a plurality of frames each comprising a header portion and subchannel data portion, the header portion of each frame having written thereto operation control data including the total number of frames and the order of the frame, and the memory reading control means recognizes the frames at the head and tail end of the program stored in the memory based on the operation control data.

3. A digital broadcast receiver according to claim 1 which further comprises data changeover means for switching between the received data of the main channel and the received data of the subchannel and feeding the received data thus selected to the demodulator means.

4. A digital broadcast receiver according to claim 3 wherein after completely feeding the received data as to one program transmitted on the subchannel to the demodulator means, the data changeover means is automatically changed over to the operation of feeding received data as to one program transmitted on the main channel to the demodulator means.

* * * * *